United States Patent [19]
Owen et al.

[11] Patent Number: 5,927,474
[45] Date of Patent: Jul. 27, 1999

[54] ROTARY TRANSFER STATION

[75] Inventors: Barry C. Owen, Southfield; Anthony F. Spisak, deceased, late of Redford, both of Mich., by Marilyn Spisak, legal representative

[73] Assignee: Elopak Systems AG, Glattbrugg, Switzerland

[21] Appl. No.: 08/766,992

[22] Filed: Dec. 16, 1996

[51] Int. Cl.⁶ .................................................. B65G 29/00
[52] U.S. Cl. ..................................... 198/475.1; 198/474.1
[58] Field of Search ............................. 198/475.1, 469.1, 198/474.1, 457.01

[56] References Cited

U.S. PATENT DOCUMENTS

| Re. 26,656 | 9/1969 | Guzzardo | 93/36 |
|---|---|---|---|
| 1,431,930 | 10/1922 | Campbell . | |
| 3,868,009 | 2/1975 | Billi et al. | 198/25 |
| 4,066,162 | 1/1978 | Miaskoff | 198/475.1 X |
| 4,337,059 | 6/1982 | Allen et al. | 493/184 |
| 4,564,101 | 1/1986 | Nagel | 198/474.1 X |
| 4,590,740 | 5/1986 | Rodocker | 53/426 |
| 4,645,063 | 2/1987 | Seragnoli | 198/475.1 X |
| 5,029,695 | 7/1991 | Kovara | 198/473.1 |
| 5,188,212 | 2/1993 | Munsch | 198/457 |
| 5,318,165 | 6/1994 | Spatafora et al. | 198/475.1 X |

FOREIGN PATENT DOCUMENTS

| 0355063 | 8/1989 | European Pat. Off. | B65B 3/02 |
|---|---|---|---|
| 2100696 | 7/1980 | United Kingdom | B65D 5/06 |

*Primary Examiner*—James R. Bidwell
*Attorney, Agent, or Firm*—Reising, Ethington, Barnes, Kisselle, Learman & McCulloch, P.C.

[57] ABSTRACT

An article transfer station for transferring articles from a first conveyor to a second conveyor whereby the station can be selected to be either a station at which articles are carried through a predetermined angle about a substantially vertical axis while changing their orientations by the angle or a station at which articles are carried through the angle about the vertical axis without changing their orientations.

22 Claims, 3 Drawing Sheets

ROTARY TRANSFER STATION

FIELD OF THE INVENTION

This invention relates generally to transfer stations and, more particularly, to a rotary transfer station wherein there is no change in orientation of an article being transferred.

BACKGROUND ART

Campbell U.S. Pat. No. 1,431,930; Billi et al. U.S. Pat. No. 3,868,009; and Munsch U.S. Pat. No. 5,188,212 each disclose rotary apparatus for transferring articles without changing the orientation of the same. Kovara U.S. Pat. No. 5,029,695 is representative of a starwheel for transferring articles in an oriented position around its periphery from one conveyor mechanism to another.

British Patent Application Publication 2100696 discloses a machine for forming, filling and sealing cartons and comprised of eight work stations, namely a straw and sealing tape applicator station, a carton blank wrapping and folding station, a seam and one end bonding station, a carton rotator and conveyor transport station, an other end closure preform station, a filler station, an other end closure sealing station, and a carton ejector station. At the seam and one end bonding station, every carton blank is transferred onto a rotary crossbar mandrel having a horizontal axis, and through a series of operations, a side seam of the carton is sealed, and one end closure of the carton is formed and sealed. At the carton rotator and conveyor transport station, every carton is removed from the crossbar mandrel, turned through a right-angle about its own longitudinal axis, which is horizontal, and inserted upon a conveyor on which the carton remains until ejected from the machine.

Allen et al. U.S. Pat. No. 4,337,059 discloses a packaging machine for forming, filling and sealing cartons, in which machine cartons are indexed in pairs through various work stations to accomplish forming, filling and sealing of the cartons. The forming of the bottom closures of the cartons is performed upon a rotary turret having a vertical axis. The turret is stepped about its axis to bring the cartons into the stations in turn and is of a type which includes two mandrels at each station and which indexes two mandrels from one station to the next station. From the turret, the bottom-closed, open-topped cartons are advanced stepwise linearly by a chain conveyor through various stations in which the cartons are filled and top closures thereof are formed. A difficulty with this machine is that a carton having its top and bottom closures orientated parallelly to each other and a carton having its top and bottom closures orientated perpendicularly to each other require differing machine layouts, especially in respect of the top and bottom closure forming stations.

Various sizes of carton have been introduced over many years. A one-liter gable-topped carton was introduced shortly before the Hitler War, with a half-gallon (or two-liter) gable-topped carton appearing at about the end of that War. Each carton sleeve has its bottom closed by folding-in and sealing of bottom closure panels, is then filled and has its top closed by folding-in and sealing of top closure panels. Each closure includes two major panels at respective opposite sides of the sleeve. In the half-gallon carton sleeve, the two major panels of the top closure are initially substantially co-planar with the two major panels of the bottom closure. However, in the liter carton sleeve the two major panels of the top closure initially lie in planes substantially perpendicular to those in which lie the two major panels of the bottom closure. Generally, those cartons in which the gable top major panels are orientated the same as those of the bottom closure are called "standard fifth panel" cartons and those cartons in which the gable top major panels are orientated 90° from those of the bottom closure are called "reverse fifth panel cartons".

Historically, the forming, filling and sealing of these standard fifth panel cartons and reverse fifth panel cartons were carried out on separate machines, an operation offering little flexibility and involving relatively high investment.

Since the mid-1960's, a machine to form, fill and seal both the half-gallon carton and the one-liter carton has been increasingly used. The machine includes a spider rotatable about a horizontal axis and having its arms in the form of respective mandrels upon which the carton sleeves are mounted and then bottom-closed. The bottom-closed cartons are transferred in turn from the mandrels to pockets of a chain conveyor for subsequent filling and then top-folding and sealing. The top-sealing is performed by sealing jaws. Either the bottom-closed half-gallon carton sleeves or the bottom-closed one-liter carton sleeves need to be turned about their own axes through 90° (relative to the one-liter carton sleeves or the half-gallon carton sleeves, as the case may be) before they arrive at the top sealing jaws, so that their major panels of their top closures are correctly orientated relative to the jaws when they arrive at the top sealing station. In order that the selected design of carton sleeve should be turned through 90° about its own axis, there is provided between the spider and the chain conveyor a relatively complicated transfer mechanism including a suction cup which is rotatable about its own axis and is spatially displaceable. The mandrels in turn present their respective bottom-closed carton sleeves to the suction cup which is advanced to seize the bottom closure of the carton sleeve and is then withdrawn to remove the carton sleeve from the mandrel and to transfer it to a pocket of the chain conveyor. For the selected carton sleeve which is to be turned through 90°, the suction cup is rotated through 90° about its own axis while carrying out the transfer. Not only is this transfer mechanism relatively complicated, but it requires significant space. A machine similar to that just described is disclosed in Guzzardo Reissue Patent Re26656.

European Patent 0355063 discloses a packaging system in which carton sleeves are sealingly closed at their bottoms while received upon respective mandrels, the open-topped cartons so formed are removed from the mandrels and filled, and the filled cartons are sealingly closed at their tops. Between the bottoms being sealingly closed and the cartons being filled, half-gallon cartons are turned through a right-angle about their own axes to bring their top closure sealing sub-panels into a correct orientation for top-sealing. For enabling such turning, the mandrels are mounted on a turntable so as to be turnable about their own axes by a cam displaceable between operative and inoperative positions. The turntable is of a rotary turret which indexes the carton sleeves through various stations mostly concerned with bottom-closing.

SUMMARY OF THE INVENTION

A general object of the invention is to provide an improved rotary transfer station for transferring articles with no change in orientation of the article.

Another object of the invention is to provide a rotary transfer device which is adaptable to receive an article, such as a four-sided carton, from one handling device, rotate same through, say, 90° and deposit same on a conveyor while maintaining the original orientation of the article.

A further object of the invention is to provide a rotary transfer device having four receivers, wherein two articles, such as four-sided cartons, may be received simultaneously in two oppositely disposed receivers, rotated 90°, and deposited onto one underlying conveyor in series, while receiving two more articles in the other two oppositely disposed receivers.

Still another object of the invention is to provide a rotary transfer device including a rotatable support member for rotation by a central drive member, and four gears rotatably mounted on the support member while movable with the support member and in mesh with four pinions themselves in mesh with the central gear and a receiver formed in each of the four gears.

A still further object of the invention is to provide such a rotary transfer device, wherein, as an alternative embodiment, pulleys are used in lieu of the central gear and the four gears, and belts are used in lieu of the four pinions and mounted around the pulleys.

A yet still further object of the invention is to provide a transfer station in which either the receivers are fixable to the rotatable support member, or the rotary transfer device is replaceable by a second rotary transfer device in which other receivers are fixed to another rotatable support member.

These and other objects and advantages will become more apparent when reference is made to the following drawings and the accompanying description.

BEST MODE FOR CARRYING OUT THE INVENTION

Figure 1:
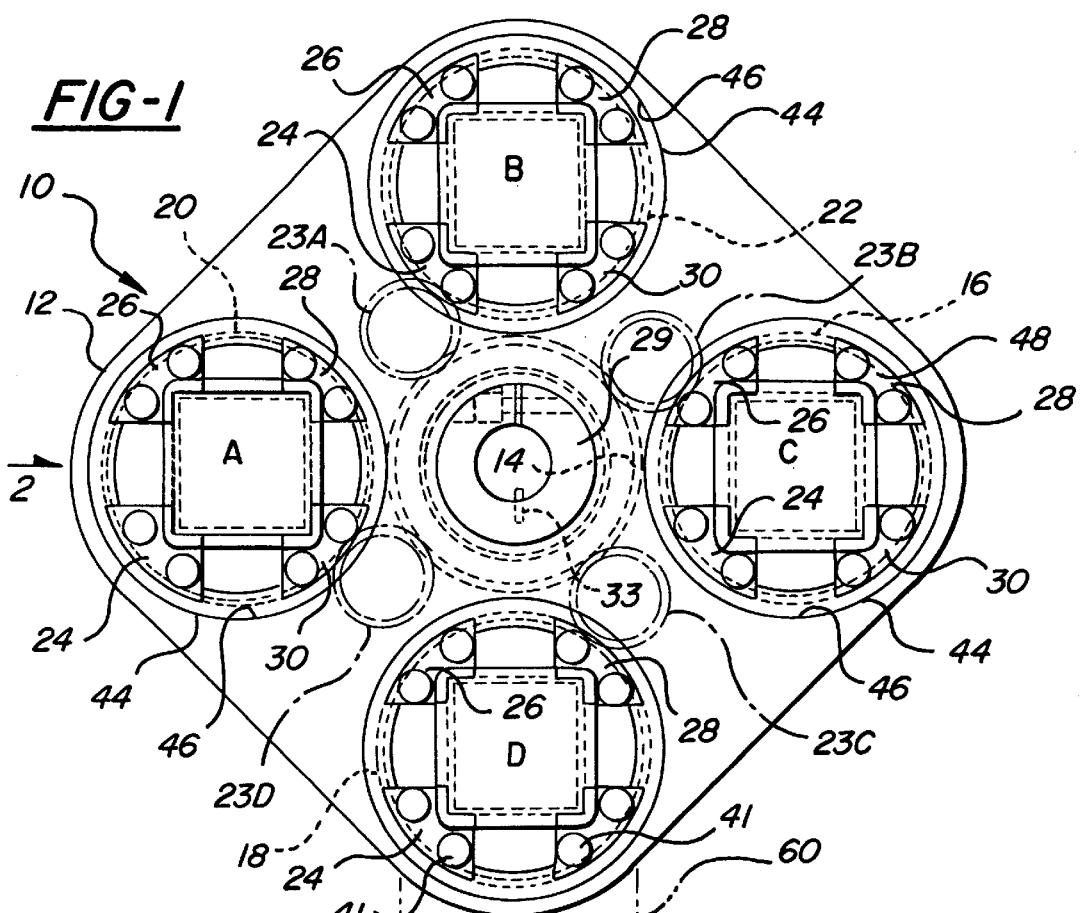
FIG. 1 is a bottom plan view of an article transfer station embodying the invention, and taken along the plane of the line 1—1 of FIG. 2, and looking in the direction of the arrows.
Figure 2:
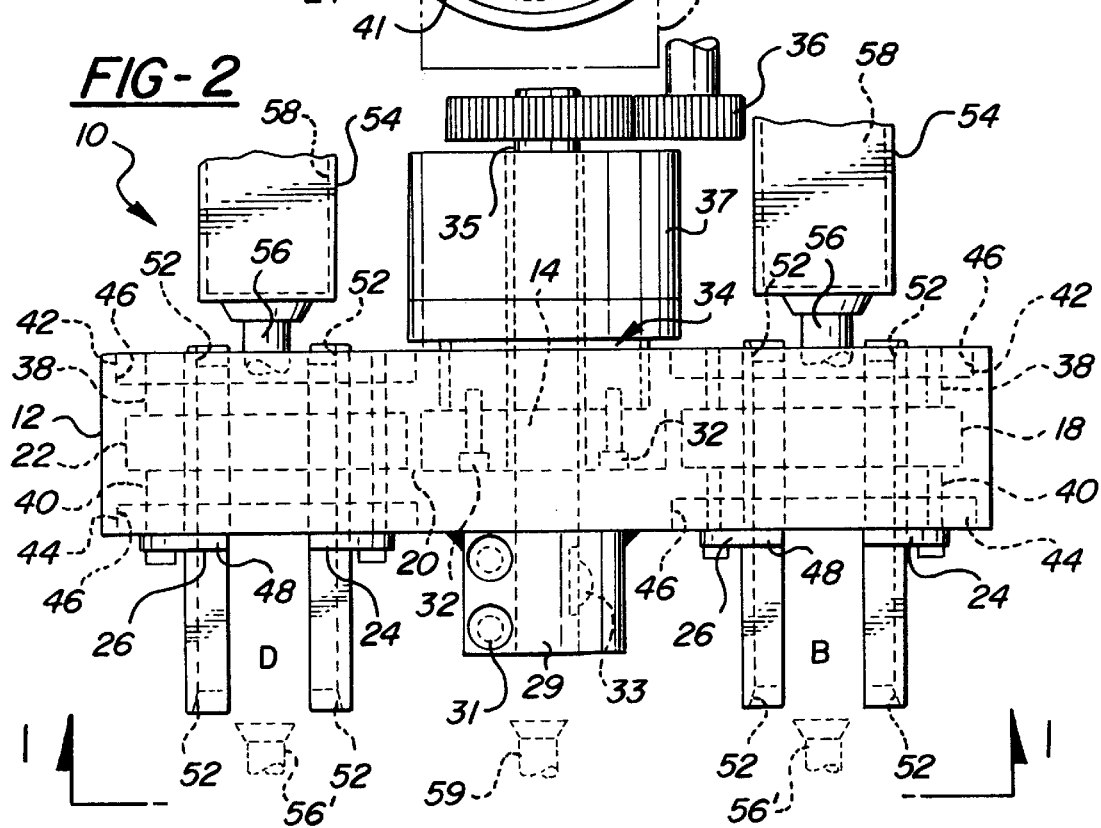
FIG. 2 is a side elevational view of the FIG. 1 structure taken in the direction of the arrow 2 in FIG. 1.

Referring now to the drawings in greater detail, FIGS. 1 and 2 illustrate a transfer station including a rotary transfer device 10 including a support member 12 rotatably mounted around a central fixed gear 14. Four equally spaced outer gears 16, 18, 20 and 22 are mounted on the support member 12, outwardly of the central fixed gear 14. An idler gear 23A is in mesh with the central fixed gear 14 and the adjacent outer gear 22. Likewise, an idler gear 23B is in mesh with the gears 14 and 16; an idler gear 23C with the gears 14 and 18; and an idler gear 23D with the gears 14 and 20.

Four equally spaced, vertically oriented corner abutment members 24, 26, 28 and 30 are secured within and downwardly beyond each gear 16, 18, 20 and 22 forming respective pockets or receivers A, B, C and D suitable for receiving articles, such as open-topped cartons to be filled with liquids downstream of the transfer station.

As shown in FIG. 2, the fixed central gear 14 is secured by bolts 32 to a member 34. The support member 12 is rotatably fixed to a central shaft 35 driven by an external source, represented as 36. A member 37 between the support 12 and drive source 36 serves as a guide for the shaft 35 extending therethrough. The member 12 is fixed to the shaft 35 by means of a C-clip 29 welded to the member 12 and fixed longitudinally of the shaft 35 by clamping screws 31 and fixed peripherally of the shaft 35 by a key 33.

Each outer gear 16, 18, 20 and 22 is formed as a mid-portion of upper and lower cylindrical extensions 38 and 40, respectively. The cylindrical extensions are rotatably mounted within respective upper and lower bearings 42 and 44 mounted in annular recesses 46 formed in the support member 12. Each lower cylindrical extension 40 has seated thereon a flange 48 formed around each set of four corner abutment members 24, 26, 28 and 30 and attached to the extension 40 by means of screws 41.

A chamfered edge 52 is formed at each end of each of the corner abutment members 24, 26, 28 and 30, serving to pilot a four-sided carton, represented as 54, into a respective pocket A, B, C or D, wherein it is retained in a friction fit.

While a single receiving pocket, say, A, may be selected in a particular application, in a preferred application, each of the pockets A and C receives a bottom-closed, thermoplastic-coated carton 54 via stripper mechanisms represented as 56 in FIG. 2, from respective mandrels, represented as 58, of a bottom forming turret, not shown here, but such as shown and described in U.S. Pat. No. 4,590,740.

After being indexed 90° (during which the rolling of the gears 16 to 22 causes the two cartons 54 in the pockets A and C to maintain their original orientation), the two cartons 54, now in the respective locations B and D in FIG. 1, are pulled downwardly by any suitable additional stripper mechanisms, represented as 59 in FIG. 2, similar to the stripper mechanism 56, out of their respective pockets onto a single line conveyor, represented as 60 in FIG. 1, to thereafter be indexed through top filling, forming, and sealing stations, such as shown and described in the above referenced U.S. Pat. No. 4,590,740. Concurrently, the pockets B and D, now in the respective positions shown as A and C, receive two additional cartons 54 from the next two mandrels 58.

Figures 3, 4:
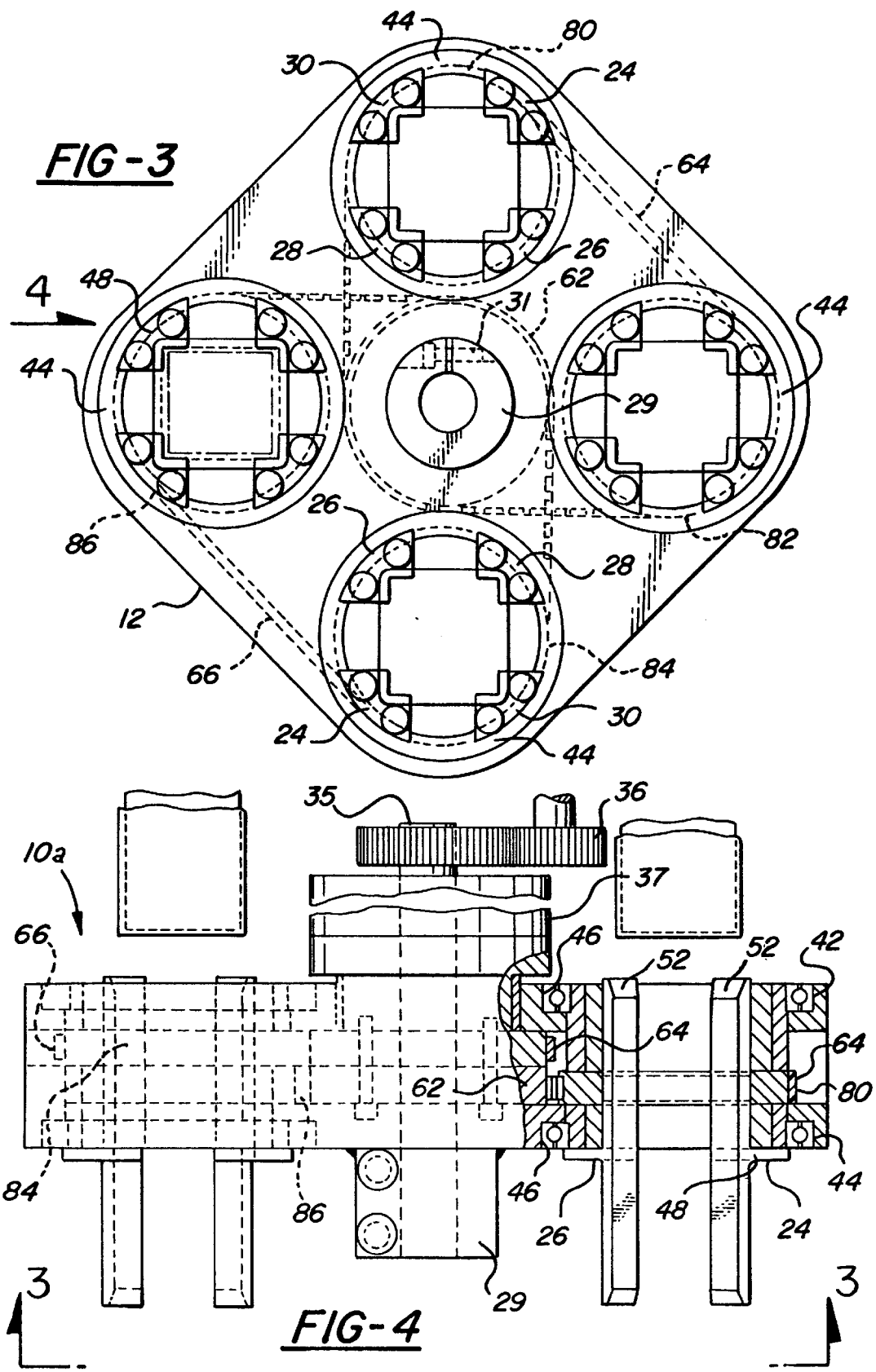
FIG. 3 is a bottom plan view of an article transfer station embodying an alternate embodiment of the invention, and taken along the plane of the line 3—3 of FIG. 4, and looking in the direction of the arrows.
FIG. 4 is a side elevational view in partial cross-section of the FIG. 3 structure and taken in the direction of the arrow 4 in FIG. 3.

Referring to the rotary transfer device 10a of FIGS. 3 and 4, it may be noted that a central double width pulley 62 is used in lieu of the central gear 14, pulleys 80, 82, 84 and 86 are used in lieu of the four outer gears 16, 18, 20 and 22, and two belts 64 and 66 are used in lieu of the four idler gears 23A to 23D. Each belt is mounted around the central pulley 62 and around two adjacent pulleys 80/82, and 84/86, which are rotatably mounted on the support 12. The four corner abutment members 24, 26, 28 and 30 are secured within each of the pulleys 80, 82, 84 and 86.

Figure 5:
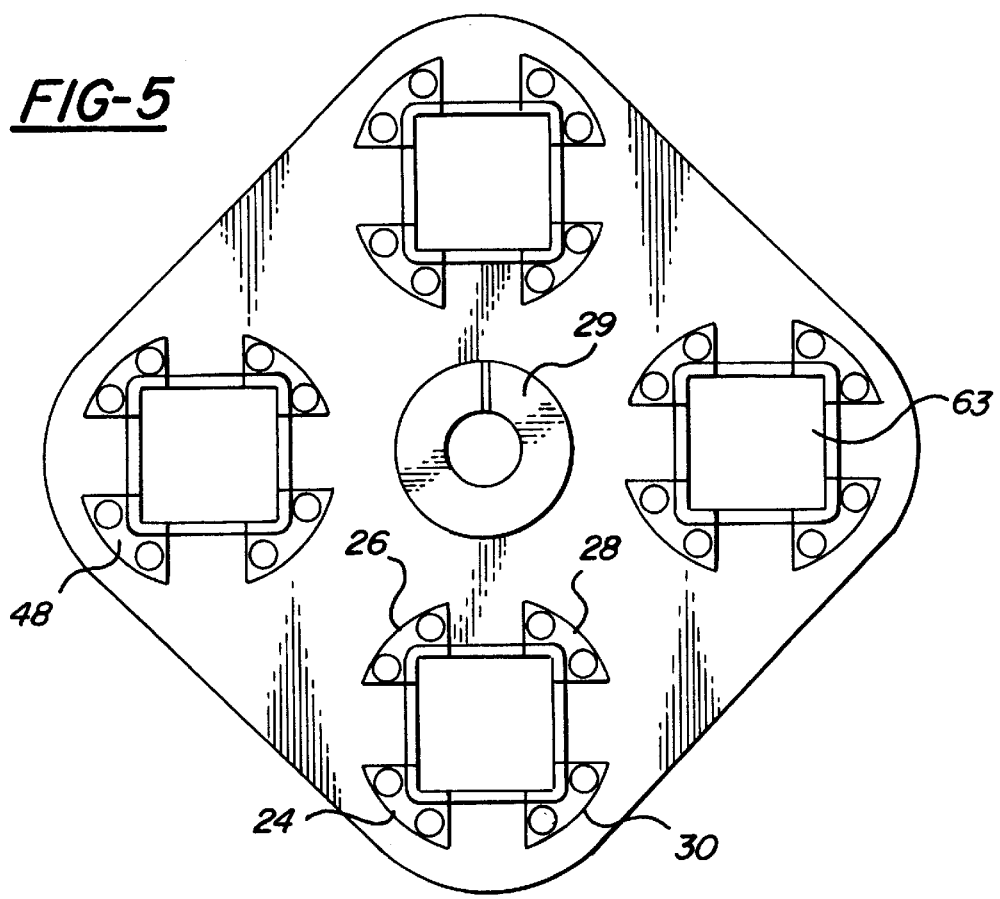
FIGS. 5 and 6 are respective bottom plan and side elevational views illustrating the article transfer station in a condition different from that of either the FIGS. 1 and 2 or the FIGS. 3 and 4 embodiments.
Figure 6:
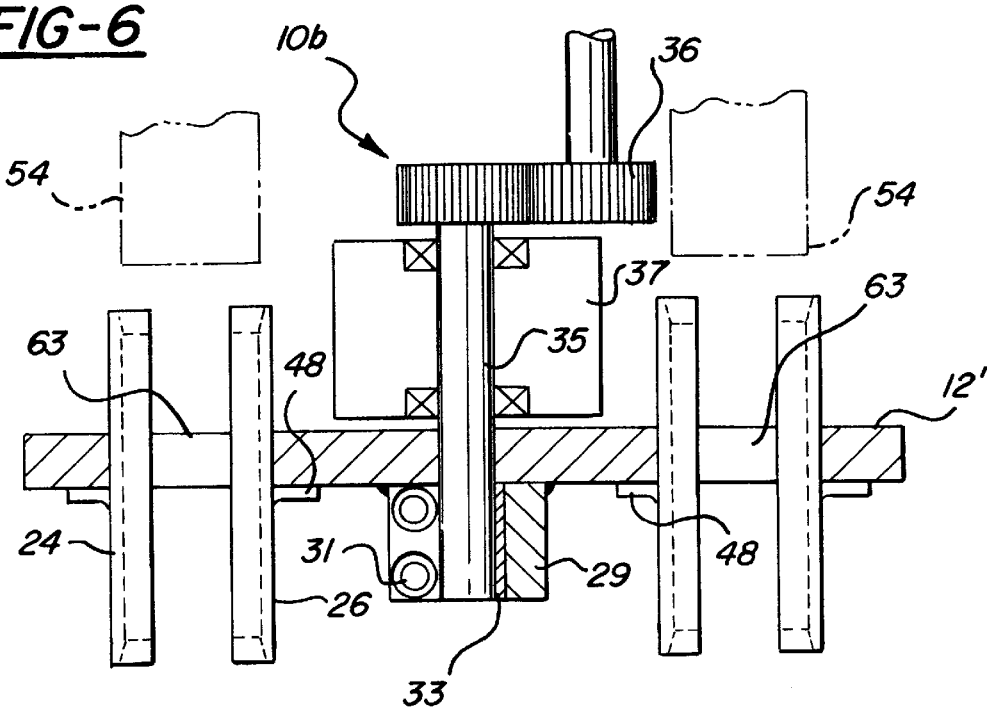

The rotary transfer device 10b of FIGS. 5 and 6 differs from the devices 10 and 10a of FIGS. 1 to 4 in that the gears of the FIGS. 1 and 2 embodiment, and the belts of the FIGS. 3 and 4 embodiment, are omitted, and the vertically oriented corner abutment members 24, 26, 28 and 30 are secured, in rectangular openings 62 through a support member 64, in any suitable manner, for example (as shown) by the screws 41 through their flanges 48, directly to the support member 64.

As such, in the event that it is desired to rotate an article 90° on a machine, as opposed to maintaining the article's original angular orientation, the device 10b is substituted for the device 10 or 10a, by loosening the screws 31 of the device 10 or 10a, sliding the device 10 or 10a downwardly off the shaft 35, sliding the device 10b upwardly onto the shaft 35 and then tightening the clamping screws 31 of the device 10b to clamp it to the shaft. Accordingly, both the standard fifth panel cartons and the reverse fifth panel cartons (wherein the gable top closure panels are oriented 90° from those of the standard fifth panel carton, but must be conveyed through the downstream top filling, forming, and sealing in the same orientation) can be processed through the bottom-forming turret without any changes therein.

Thus, a packaging machine manufacturer can simply select either the device 10 or 10a or the device 10b for fitting to a machine to be supplied to a package producer, depending upon whether the machine is to run standard fifth panel cartons or reverse fifth panel cartons, or can supply together with the machine both the device 10 or 10a and the device 10b, so that the producer can readily change the machine over from one style of carton to the other.

A possible alternative to having two different kinds of device 10 (or 10a) and 10b is that the device 10 or 10a could have its pinions 23A to 23D, or belts 64 and 66, disengageable and its gears 16 to 22, or pulleys 80 to 86, fixable to the rotary support member 12. The machine manufacturer can then send out the machine either with its pinions or belts disengaged and its gears or pulleys fixed to the rotary support member, or with its pinions or belts engaged and its gears or pulleys rotatable relative to the support member. Otherwise, the package producer can changeover the device from one condition to the other.

Industrial Applicability

It should be apparent that the invention provides an improved rotary transfer device for transferring cartons with no change in carton orientation.

It should be further apparent that the receiver formed within each outer gear or ring could be formed in any desired shape other than the four corner abutment members, to accommodate a variety of article shapes.

It should be still apparent that, when desired, a selected one of the four receiver positions could be utilized, in lieu of two oppositely disposed positions, for transferring cartons one at a time to a conveyor, rather than in pairs.

It should also be apparent that basically identical forming, filling and sealing machines, and their bottom forming turrets and mandrels 58, can be configured to run the above referenced standard or reverse fifth panel cartons by installing appropriate rotary transfer devices 10, 10a, or 10b, for co-operation therewith.

While three embodiments have been shown and described, other modifications are possible within the scope of the following claims.

What is claimed is:

1. A method comprising selecting an article transfer station, for transferring articles from a first conveyor to a second conveyor, to be either a station at which articles are carried through a predetermined angle about a substantially vertical axis while changing their orientations by said angle, or a station at which articles are carried through said predetermined angle about said axis without changing their orientations, characterized in that said selecting comprises selecting to connect to a rotary mount at the station either a first device including first article-receivers rotatable relative to a first support member included in said first device, or a second device including second article-receivers fixed to a second support member included in said second device.

2. An article transfer station for transferring articles from a first conveyor to a second conveyor comprising means whereby the station can be selected to be either a station at which articles are carried through a predetermined angle about a substantially vertical axis while changing their orientations by said angle, or a station at which articles are carried through said predetermined angle about said axis without changing their orientation, said means including a first device turnable about said axis and including receivers for receiving respective articles, a mount mounting said device and turnable about said axis, and a connector readily releasably connecting said device to said mount and whereby said device can be disconnected from said mount for replacement by a second device including other receivers for receiving respective articles.

3. A station according to claim 2, wherein said connector is readily releasably clamped around said mount.

4. A station according to claim 3, wherein said mount comprises a substantially vertical shaft.

5. A station according to claim 2, and further comprising a central fixed member, said first device comprising a support member turnable about said axis with said mount, and said receivers being rotatably mounted relative to said support member while movable with said support member and being operatively connected to the central fixed member so as to be driven thereby.

6. A station according to claim 5, wherein said central fixed member is a gear, and said mount comprises an externally driven member extending axially through said central fixed gear, and said receivers comprise driven gears in mesh with idler gears of said first device which, in turn, are in mesh with said central fixed gear.

7. A station according to claim 6, wherein said receivers comprise article-holding members secured in each of said driven gears.

8. A station according to claim 7, wherein said article-holding members are four substantially vertical corner guides.

9. A station according to claim 8, wherein said four substantially vertical corner guides each form a 90° receiving corner, with a chamfer formed at an upper inlet edge of each guide.

10. A station according to claim 5, wherein said central fixed member is a double width pulley, and said mount comprises an externally driven member extending axially through said double width pulley, said receivers comprise single pulleys, and said first device includes belts selectively mounted around the double width and single pulleys.

11. A station according to claim 10, wherein said belts are two belts, each mounted around said double width pulley and two of said single pulleys.

12. A station according to claim 10, wherein said receivers comprise article-holding members secured in each of said single pulleys.

13. A station according to claim 12, wherein said article-holding members are four corner guides.

14. A station according to claim 2, and further comprising loading means for placing an article in a selected one of said receivers.

15. A station according to claim 14, and further comprising unloading means for removing each article from each receiver and placing said article on an underlying conveyor.

16. A station according to claim 2, and further comprising loading means for placing two articles in respective oppositely disposed receivers.

17. A station according to claim 16, and further comprising unloading means for removing said two articles from said respective oppositely disposed receivers.

18. A station according to claim 16, wherein said articles are cartons, and said loading means are adapted to remove said cartons from a pair of mandrels.

19. A station according to claim 17, wherein said articles are cartons, and said unloading means are adapted to place said cartons in series on a conveyor.

20. A station according to claim 2, wherein said first device comprises a support member turnable about said axis with said mount, said receivers being fixed to said support member.

21. A method, characterized by selecting a carton transfer station, for transferring cartons from a first conveyor to a second conveyor, to be either a station at which cartons are carried through a predetermined angle about a substantially vertical axis while changing their orientations by said angle, or a station at which cartons are carried through said predetermined angle about said axis without changing their orientations, wherein said selecting comprises selecting to connect to a rotary mount at the station either a first device including first carton-receivers rotatable relative to a first support member included in said first device, or a second device including second carton-receivers fixed to a second support member included in said second device.

22. A method, characterized by selecting a carton transfer station, for transferring cartons from a first conveyor to a second conveyor, to be either a station at which cartons are carried through a predetermined angle about a substantially vertical axis while changing their orientations by said angle, or a station at which cartons are carried through said predetermined angle about said axis without changing their orientations, wherein said selecting comprises disconnecting from a rotary drive at the station one of a first device including first carton-receivers rotatable relative to a first support member included in said first device and a second device including second carton-receivers fixed to a second support member included in said second device and replacing said one of said first device and said second device by the other of said first device and said second device.

* * * * *